(12) United States Patent
Webb

(10) Patent No.: US 8,770,911 B2
(45) Date of Patent: Jul. 8, 2014

(54) APPARATUS AND METHOD FOR COLLATING PRODUCTS

(75) Inventor: Michael Webb, Fleet (GB)

(73) Assignee: Quin Systems Limited (GB)

( * ) Notice: Subject to any disclaimer, the term of this patent is extended or adjusted under 35 U.S.C. 154(b) by 50 days.

(21) Appl. No.: 13/386,599

(22) PCT Filed: Jul. 23, 2010

(86) PCT No.: PCT/GB2010/051227
§ 371 (c)(1),
(2), (4) Date: Jan. 23, 2012

(87) PCT Pub. No.: WO2011/010169
PCT Pub. Date: Jan. 27, 2011

(65) Prior Publication Data
US 2012/0128460 A1    May 24, 2012

(30) Foreign Application Priority Data
Jul. 24, 2009   (GB) .................................. 0912945.3

(51) Int. Cl.
*B65G 57/14*   (2006.01)
(52) U.S. Cl.
USPC ................. 414/790.3; 414/790.2; 414/793.5; 198/725
(58) Field of Classification Search
USPC ........ 198/418.7, 419.2, 419.3, 430, 607, 644, 198/698, 725, 801; 414/788.1, 788.2, 414/788.6, 788.7, 789.2, 789.9, 790.1, 414/790.2, 790.3, 790.4, 790.6, 790.7, 414/790.8, 794.6, 901; 53/247, 540, 544
See application file for complete search history.

(56) References Cited

U.S. PATENT DOCUMENTS

| | | | | |
|---|---|---|---|---|
| 3,019,886 A | * | 2/1962 | Winkler et al. | 414/798.5 |
| 3,139,714 A | * | 7/1964 | Hall | 53/540 |
| 3,479,932 A | * | 11/1969 | Backman et al. | 414/790.4 |
| 3,720,040 A | * | 3/1973 | Rocker | 53/500 |
| 3,876,083 A | * | 4/1975 | Evans et al. | 414/789.1 |
| 4,074,508 A | * | 2/1978 | Reid | 53/501 |
| 4,492,070 A | * | 1/1985 | Morse et al. | 53/438 |
| 5,012,628 A | * | 5/1991 | Van Oord | 53/448 |
| 5,235,796 A | | 8/1993 | Campbell | |
| 5,311,724 A | * | 5/1994 | Vernon et al. | 53/529 |
| 5,495,932 A | | 3/1996 | Dyess | |
| 2001/0041130 A1 | | 11/2001 | Baur | |

FOREIGN PATENT DOCUMENTS

| | | |
|---|---|---|
| DE | 4341644 A1 | 6/1994 |
| EP | 0081628 A1 | 6/1983 |
| EP | 0677442 A1 | 10/1995 |
| EP | 1787910 A1 | 5/2007 |

(Continued)

OTHER PUBLICATIONS

Search report in GB 0912945.3, Nov. 30, 2009.

*Primary Examiner* — Gregory Adams
(74) *Attorney, Agent, or Firm* — Barnes & Thornburg LLP

(57) ABSTRACT

A collating conveyor (4, 6) receives products (2) sequentially from a delivery point and collates them into groups (8). A pusher (9) transfers groups (8) of products from the collating conveyor (4, 6) to a receiving trough (10), where they are turned through a predetermined angle B. The collating conveyor (4, 6) is inclined to the horizontal and is provided with lugs (5, 7), each of which supports a stack (8) of products under the effect of gravity. A pick-and-place head (11) picks up a group (8) of products from the trough (10) by gripping and clamping the products (2) together.

18 Claims, 2 Drawing Sheets

(56) References Cited

FOREIGN PATENT DOCUMENTS

| FR | 1463694 | A | 12/1966 |
| GB | 1298171 | A | 11/1972 |
| GB | 2412104 | A | 9/2005 |
| JP | 11/59847 | A | 3/1999 |
| WO | WO-96/22223 | A1 | 7/1996 |
| WO | WO-01/26971 | A1 | 4/2001 |
| WO | WO-2009/062493 | A1 | 5/2009 |

* cited by examiner

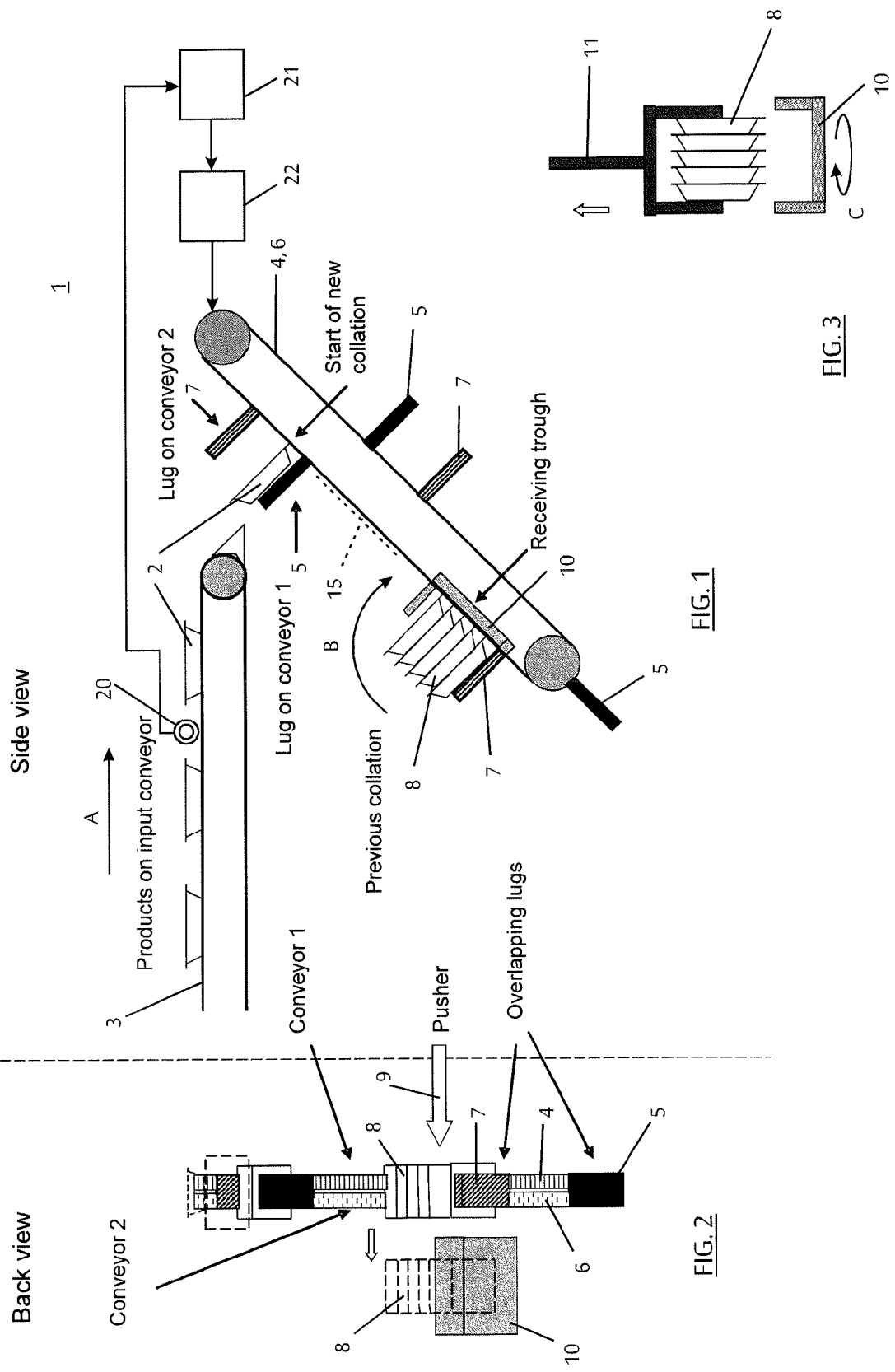

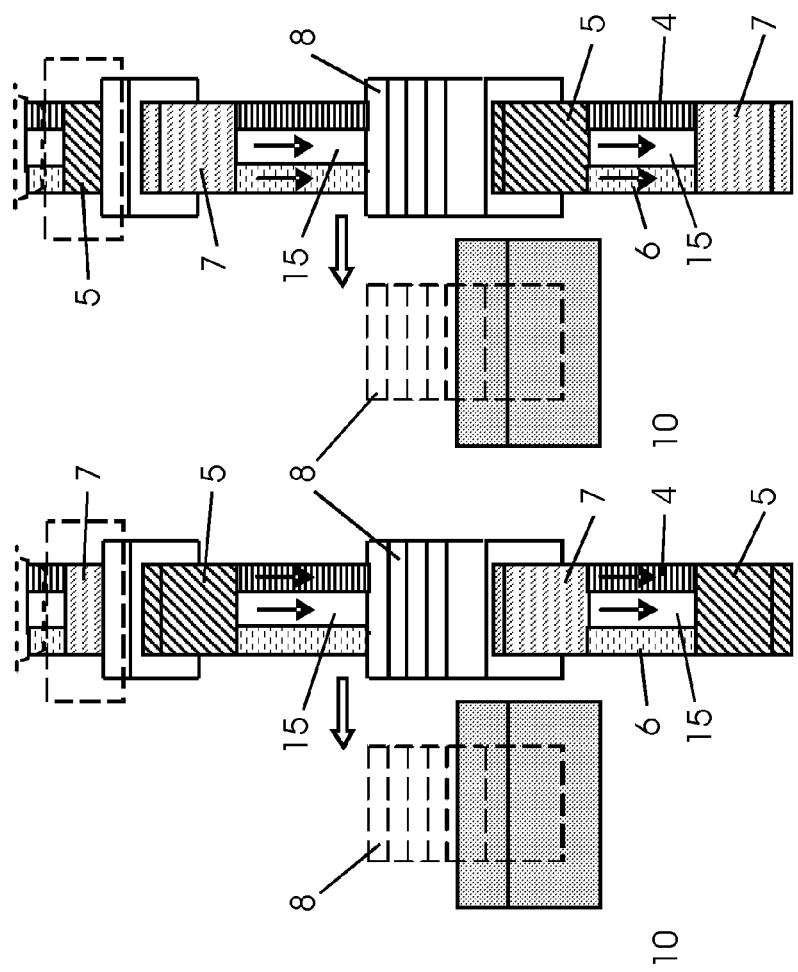
FIG. 5
FIG. 6
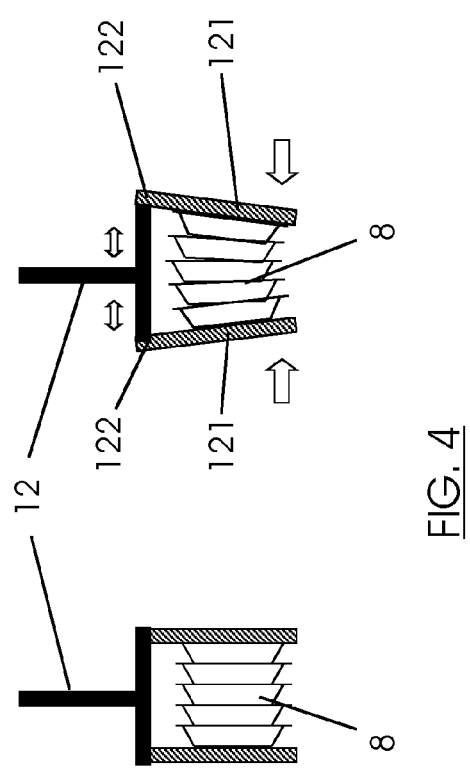
FIG. 4

APPARATUS AND METHOD FOR COLLATING PRODUCTS

The present invention relates to product handling and is concerned particularly with turning and collating products.

There is a requirement to place into a case a group of products on their edge, as opposed to more normal horizontal orientation. In order to do this, the products have to be both collated into the number required (group) and turned through 90 degrees about their leading edge and placed into the box. This fulfils a fast-growing requirement for shelf-ready cases in which the products are correctly oriented for display after the top of the box is torn off.

At the current time, this type of packing is usually done by hand, with several operators collecting together the required number of packs and then upending them before placing them into a case. For high product arrival rates, this would require many operators to fill and erect cases. A typical product arrival rate is around 120 packs per minute which, with typically 5 products per case, requires at least 24 cases to be made and filled per minute.

Another alternative automated method is to rotate the new empty case through 90 degrees and then use a moving conveyor to shoot the packs into the upended case and then index the case vertically until it is full. Once full, the case would be turned back onto its base and then removed, making room for the next empty case and so on. A problem with this is that the case movement has to be achieved between product arrivals, greatly restricting the product rate that can be handled. It also results in a larger, more complex machine with restricted pack layout flexibility for future arrangements.

Preferred embodiments of the present invention aim to provide improved apparatuses and methods for both turning and collating products.

According to one aspect of the present invention, there is provided apparatus for turning and collating products, the apparatus comprising:
   a. a collating conveyor arranged to receive products sequentially from a delivery point and collate the products into groups;
   b. transfer means arranged to transfer groups of products from the collating conveyor to a holding station; and
   c. turning means arranged to turn a group of products at said holding station through a predetermined angle:
   wherein, in use, said collating conveyor is inclined to the horizontal and is provided with lugs, each of which supports a stack of products under the effect of gravity.

Preferably, said collating conveyor comprises two parallel conveyors and drive means arranged to drive the parallel conveyors independently as products arrive on the collating conveyor, each of the parallel conveyors being provided with a respective set of lugs that overlie both of the parallel conveyors.

Preferably, said drive means is arranged to drive the parallel conveyors in alternate cycles.

Said drive means may be arranged to index the parallel conveyors.

The apparatus may further comprise a third parallel conveyor arranged between the said two parallel conveyors and having a conveying surface that is raised slightly above those of said two parallel conveyors.

Preferably, said third conveyor is arranged to be driven in synchronism with both of said two parallel conveyors.

Said turning means may be arranged to turn a group of products at said holding station through said predetermined angle in a first plane, and through a further predetermined angle in a second plane.

Said further predetermined angle may be 90 degrees and said second plane may be a horizontal plane.

Preferably, said transfer means is arranged to push a group of products transversely off said collating conveyor and into said holding station.

Preferably, said holding station comprises a trough arranged to hold a group of products.

Preferably, said trough is of adjustable dimensions to accommodate groups of products of differing dimensions.

Apparatus as above may further comprise an input conveyor arranged to deliver products sequentially to said delivery point, which is located above said collating conveyor.

Apparatus as above may further comprise pick-and-place means arranged to pick up a group of products from said holding station, after turning by said turning means, and then place the turned group of products in a predetermined position.

Preferably, said predetermined position is defined by a case into which the turned group of products is placed.

Preferably, said predetermined angle is such as to turn the products through a total of substantially 90 degrees from their original orientations at said delivery point.

A gripper may be arranged to pick up a group of products from a holding station, said gripper having fingers or blades that may be moved into and out of inclined positions to form a gripped group of products into an arch.

The apparatus may further comprise drive means arranged to drive at least part of the collating conveyor at a nominal constant velocity and adjust said velocity in dependence upon the detected positions of products approaching said delivery point.

In another aspect, the invention provides a method of turning and collating products, the method comprising the steps of:
   a. receiving products sequentially from a delivery point and collating the products into groups by means of a collating conveyor;
   b. transferring groups of products from the collating conveyor to a holding station; and
   c. turning a group of products at said holding station through a predetermined angle:
   wherein said collating conveyor is inclined to the horizontal and is provided with lugs, each of which supports a stack of products under the effect of gravity.

Such a method may be carried out by an apparatus according to any of the preceding aspects of the invention.

For a better understanding of the invention and to show how embodiments of the same may be carried into effect, reference will now be made, by way of example, to the accompanying diagrammatic drawings, in which:

FIG. 1 is a schematic side view of one example of an embodiment of the invention for collating and turning products;

FIG. 2 is an end view of the apparatus shown in FIG. 1;

FIG. 3 is a detail view of a receiving trough of the apparatus of FIGS. 1 and 2;

FIG. 4 is a detail view of an improved gripper for use with a pick-and-place head; and FIGS. 5 and 6 are views similar to that of FIG. 2 but showing an improved apparatus with a third conveyor.

The illustrated turning and collating apparatus 1 is arranged to receive a high speed flow of products 2 from a horizontal input conveyor 3, as shown by arrow A. The products 2 are of a generally flat configuration and are delivered in a substantially horizontal orientation from the input conveyor 3.

The turning and collating apparatus 1 comprises a collating conveyor comprising first and second endless-belt conveyors 4 and 6 arranged side-by-side, as may be seen in FIG. 2, in a manner similar to that known as a "race track" arrangement. The conveyors 4 and 6 respectively carry first lugs 5 and second lugs 7, each of which overhangs both conveyors 4 and 6. The conveyors 4 and 6 are inclined to the horizontal—in the present example, at an angle of 45°—such that the lugs 5 and 7 are correspondingly inclined to the vertical over the main run of the conveyors 4 and 6. In the present example, the conveyors 4 and 6 are driven and indexed independently.

As seen in FIG. 1, a first lug 5 is positioned adjacent but below the delivery end of the input conveyor 3. Products 2 fall off the end of the conveyor 3 onto the conveyors 4 and 6 below, where they are supported by the first lug 5.

In a first phase of operation, the products 2 are collated in a stack on the conveyors 4 and 6. This is achieved by transferring the moving products 2 from the input conveyor 3 into or onto the conveyors 4 and 6, where the lugs 5 and 7 take the weight of a collated group of products. The conveyors 4 and 6 are downwardly indexed by the distance of one product depth for each product arrival until a required collation of products has been assembled. (A downwardly moving conveyor is sometimes referred to as a "lowerator".)

A special feature of the illustrated embodiment is that the downward indexing conveyors 4 and 6 are angled between the vertical and the horizontal to ensure that the products stay on the indexing conveyors and to reduce space usage within the machine. This also means that the products 2, when arriving on the conveyors 4 and 6, are already turned through some angle, reducing the remaining angle to be turned at a later stage in order to achieve a 90-degree transition to on-edge orientation.

Once the required collation has been made, the products 2 (in the example as illustrated in FIG. 1) are then indexed by the first conveyor 4 and lugs 5 through a longer distance, so that they are clear of the product entry point. This is to allow the second indexing conveyor 6 with lugs 7 to immediately start assembling the next collation whilst the previous collation is removed. The advantage of using the two conveyors 4 and 6 is that enough time is allowed for the collation to be removed from one conveyor whilst the other builds a second collation without having to pause the high-speed product input stream.

This differs from the known principle of a "race-track" in that, in this case, gravity is used to keep the products together, whereas a race-track is typically horizontally mounted and uses individual pockets to receive products. Using gravity has the advantage of allowing for different depths of product and collations without requiring any change of parts. Another advantage that is important for a subsequent pick-and-place operation is that there is no significant gap between the products in the collation. If individual pockets were used, the resulting gaps would need to be closed prior to pick-up, to ensure a snug fit in the case.

In FIG. 1, a new collation is shown starting on a first lug 5 on first conveyor 4, whilst a previous collation 8 is shown below on a respective second lug 7 on second conveyor 5, ready for removal.

The collation 8 is removed from the conveyors 4 and 6 by using a transfer means in the form of a sideways pusher 9 (this could be pneumatically or servo operated), which pushes the collation 8 into a holding station defined by an adjustable receiving trough 10, as shown in dotted lines in FIG. 2. At this time, the trough 10 is aligned with the conveyors 4 and 6. Once the trough 10 receives the collation 8, it is tilted (as shown by arrow B in FIG. 1) in order to complete the rotation of the collation 8 to the required on-edge orientation. The trough 10 can also be lifted as it is tilted. As shown in FIG. 3, a pick-and-place head 11 then can pick up the collation 8 from the trough 10 by gripping and clamping the products 2 together. Once the collation 8 has been removed, the trough 10 and pusher 9 are returned to their start positions, ready for the next collation to arrive (this time, support by the respective first lug 5 on the first conveyor 4). The trough 10 is of adjustable dimensions to allow for different product depths and collations. More than one collation 8 may be pushed into the trough 10 before it is tilted, which collations are then removed from the trough 10 together.

In the modification of FIG. 4, a pick-and-place head comprises an inventive gripper 12 with fingers or blades 121 that clamp a collation 8 of the on-edge products in the trough 10. The fingers or blades 121 can rotate around pivot points 122 as well as axially clamp the products 2. This has the added benefit of forming the products 2 into an arch just like that used in a bridge structure. This will provide the same benefit as that in a bridge by making the packs 2 self-supporting. This will be especially useful when there is a larger number of products 2 to be picked and should ensure that the products in the middle of the collation 8 are not dropped.

The resulting V-shape of the fingers or blades 121 should also facilitate the entry of the group 8 of products into the top of a case, helping also to slightly push the ends of the case apart.

The fingers or blades 121 will then return to the vertical position once the products 2 have been placed in the case, ensuring the products 2 are properly released and therefore remain in the case after placement.

In the illustrated example, the conveyors 4 and 6 are angled at approximately 45° and the total rotation angle of the products 2 is substantially 90°. However, it is to be appreciated that these angles could be varied as desired.

In the illustrated example, two conveyors 4 and 6 are used, each with a plurality of lugs 5 and 7, which may be a cost-effective and efficient arrangement. However, in principle, any greater number of parallel conveyors may be used with overlying lugs and, as a minimum requirement, each conveyor would have at least one lug.

A pick and place head such as 11 can use an alternative means to a gripper such as 12 to pick up a collation 8—for example, a vacuum device may be used.

FIGS. 5 and 6 illustrate an improved arrangement in which a third endless-belt conveyor 15 is positioned between the first and second conveyors 4 and 6. The third conveyor 15 carries no lugs such as 5 and 7. However, its conveying surface is raised slightly, relative to the conveying surfaces of the first and second conveyors 4 and 6. This provides a more stable base for the products 2 to travel on. The slightly raised surface of the third conveyor 15 is shown partially and diagrammatically in broken line in FIG. 1.

The third conveyor 15 may be moved independently of the "race-track" conveyors 4 and 6 to ensure that the angled products 2 do not fall over whilst being indexed. The drive for the third conveyor 15 may be from a separate motor. Alternatively, a lower cost option would be to drive the third conveyor 15 from either of the adjacent "race-track" conveyors 4 and 6—for example, in each case via a one-way "sprag" clutch. If the third conveyor 15 is connected to both of the conveyors 4 and 6 via such a clutch, this may provide an economical way of making sure that the centre conveyor 15 travels whenever either of the race-track conveyors 4 and 6 indexes. The solid arrows in FIG. 5 illustrate the centre conveyor 15 moving in synchronism with the first conveyor 4. The solid arrows in FIG. 6 illustrate the centre conveyor 15 moving in synchronism with the second conveyor 6.

The third centre conveyor 15 helps to inhibit skewing of the products 2 when they are indexed. Skewing may otherwise occur when there is movement of only one of the two race-track conveyors 4 and 6, upon which the products 2 would otherwise be sitting.

Apparatus as illustrated and described above may typically handle product input rates of around 120 products per minute. If higher throughputs are needed or if the product has limited stability when "on-edge", then a modified technique can be applied to creating and moving the product collation. In this case, instead of indexing the respective race-track conveyor belt 4 or 6 on each new product arrival, the current conveyor 4 or 6 can be kept in continuous motion (nominally at a constant velocity), position synchronised to the incoming products 2. Small, smooth corrections to the velocity of the conveyor 4 or 6 can then be made to allow for typically small positioning errors of product arrival. This greatly minimises the accelerations applied to the products, thus allowing for higher speeds or less stable product. Once a collation has been made, the collation is then gently accelerated to a new higher velocity to clear the way for the other race-track conveyor 4 or 6, as in the case of the indexing method described previously. Stopping decelerations may typically still be as before but this is less important, as this usually has the effect of straightening up the products 2 as they move towards a now stationary lug 5 or 7.

In FIG. 1, an optical (or other) detector 20 detects the leading edge of an arriving product and sends a corresponding detection signal to a controller 21. The controller 21 sends control signals to drive means 22 for the conveyors 4, 6 and 15, and, in the event of a deviation in arrival time of a given product 20, the controller 21 controls the drive means 22 to apply a smooth correction to the velocity of the current race-track conveyor 4 or 6 (with centre conveyor 15 if present), so that the given product 20 arrives in the right place on the respective conveyor 4 or 6. It is assumed that the input conveyor 3 runs at a constant speed but, so long as the controller 21 is provided with data representing the speed of the input conveyor 3 and any variations thereof, the controller can control the speeds of the conveyors 4, 6 and 15 correspondingly.

In another variation, the trough 10 may be rotated about a vertical axis (as shown by arrow C in FIG. 3, as it is tilted into its horizontal position as indicated by arrow B. This allows the collated products 8 to be rotated in a horizontal plane. The advantage of this is that the collated products 8 can also be presented 'on-edge' and facing the side of a case rather than the front. The case could then have a 'tear-off' side rather than a 'tear-off' front. This can suit certain product dimensions and collation without having to change the orientation of the box, which is often required by a typical case erector.

In the context of this specification, the term "lug" is used conveniently to denote any suitable member for supporting products on a conveyor belt.

In this specification, the verb "comprise" has its normal dictionary meaning, to denote non-exclusive inclusion. That is, use of the word "comprise" (or any of its derivatives) to include one feature or more, does not exclude the possibility of also including further features.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. Apparatus for turning and collating products, the apparatus comprising:
   a. a collating conveyor arranged to receive products sequentially from a delivery point and collate the products into groups; and
   b. a holder arranged at one side of the collating conveyor to receive groups of products from the collating conveyor:
   wherein, in use, said collating conveyor is inclined to the horizontal and the vertical such that, as they arrive on the collating conveyor, products are turned through a first angle with respect to their orientation at the delivery point and said collating conveyor is provided with lugs, each of which supports a stack of products under the effect of gravity; and
   the holder is movable between a first position in which it is aligned with the collating conveyor to receive groups of products from the collating conveyor and a second position such that products in the holder are turned through a second angle that adds to said first angle.

2. Apparatus according to claim 1, wherein said collating conveyor comprises two parallel conveyors and drive means arranged to drive the parallel conveyors independently as products arrive on the collating conveyor, each of the parallel conveyors being provided with a respective set of lugs that overlie both of the parallel conveyors.

3. Apparatus according to claim 2, wherein said drive means is arranged to drive the parallel conveyors in alternate cycles.

4. Apparatus according to claim 2, wherein said drive means is arranged to index the parallel conveyors.

5. Apparatus according to claim 2, further comprising a third parallel conveyor arranged between the said two parallel conveyors and having a conveying surface that is raised slightly above those of said two parallel conveyors.

6. Apparatus according to claim 5, wherein said third conveyor is arranged to be driven in synchronism with both of said two parallel conveyors.

7. Apparatus according to claim 1, wherein said holder is movable between said first and second positions in a first plane, and through a predetermined angle in a second plane.

8. Apparatus according to claim 7, wherein said predetermined angle is 90 degrees and said second plane is a horizontal plane.

9. Apparatus according to claim 1, further comprising a pusher arranged to push a group of products transversely off said collating conveyor and into said holder.

10. Apparatus according to claim 1, wherein said holder comprises a trough arranged to hold a group of products.

11. Apparatus according to claim 10, wherein said trough is of adjustable dimensions to accommodate groups of products of differing dimensions.

12. Apparatus according to claim 1, further comprising an input conveyor arranged to deliver products sequentially to said delivery point, which is located above said collating conveyor.

13. Apparatus according to any of the preceding claims, further comprising pick-and-place means arranged to pick up a group of products from said holder, after turning through said second angle, and then place the turned group of products in a predetermined position.

14. Apparatus according to claim 13, wherein said predetermined position is defined by a case into which the turned group of products is placed.

15. Apparatus according to claim 1, wherein said first and second angles are such as to turn the products through a total of substantially 90 degrees from their original orientations at said delivery point.

16. Apparatus according to claim 1, further comprising a gripper arranged to pick up a group of products from said holder, said gripper having fingers or blades that may be moved into and out of inclined positions to form a gripped group of products into an arch.

17. Apparatus according to claim 1, further comprising drive means arranged to drive at least part of the collating conveyor at a nominal constant velocity and adjust said velocity in dependence upon the detected positions of products approaching said delivery point.

18. A method of turning and collating products, the method comprising the steps of:
   a. receiving products sequentially from a delivery point and collating the products into groups by means of a collating conveyor; and
   b. transferring groups of products from the collating conveyor to a holding station:
   wherein said collating conveyor is inclined to the horizontal and the vertical such that, as they arrive on the collating conveyor, products are turned through a first angle with respect to their orientation at the delivery point and said collating conveyor is provided with lugs, each of which supports a stack of products under the effect of gravity; and
   the holder is movable between a first position in which it is aligned with the collating conveyor to receive groups of products from the collating conveyor and a second position such that products in the holder are turned through a second angle that adds to said first angle.

* * * * *